Dec. 17, 1963 F. J. CARSON ETAL 3,114,571
VEHICLE WINDSHIELDS
Filed Oct. 31, 1957 8 Sheets-Sheet 1
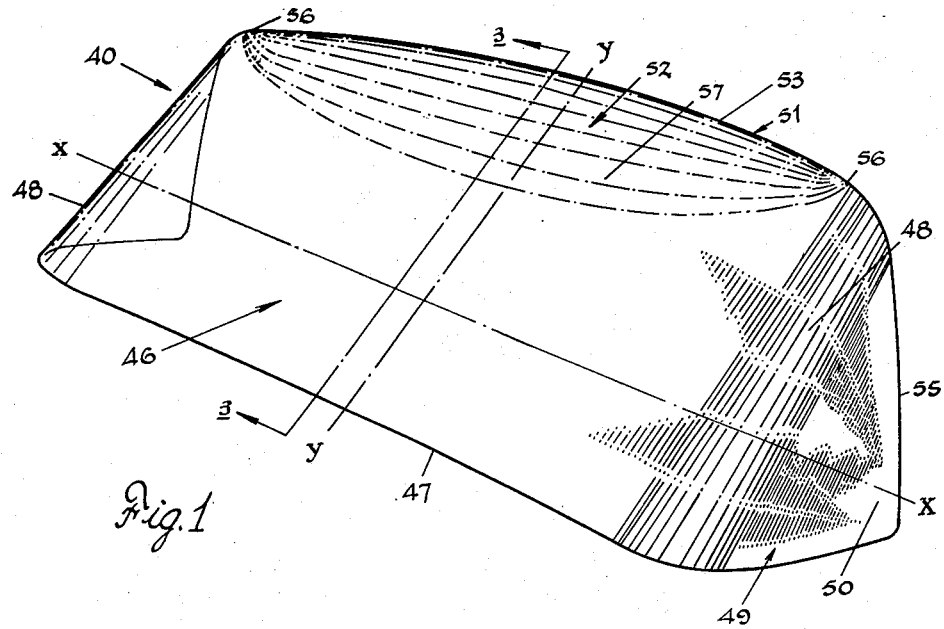
Fig. 1
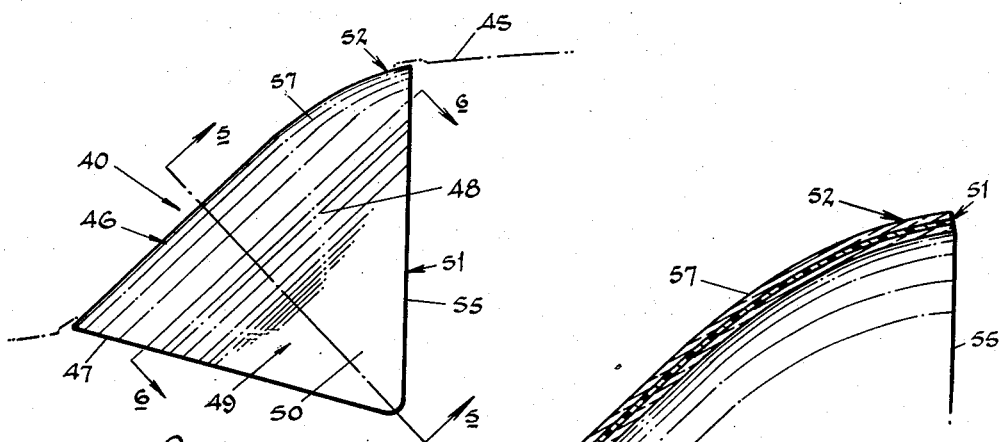
Fig. 2
Fig. 3
INVENTORS
Frank J. Carson and
BY Herbert A. Leflet, Jr.
Nobbe & Swope
ATTORNEYS Dec. 17, 1963
F. J. CARSON ETAL
3,114,571
VEHICLE WINDSHIELDS
Filed Oct. 31, 1957
8 Sheets-Sheet 2
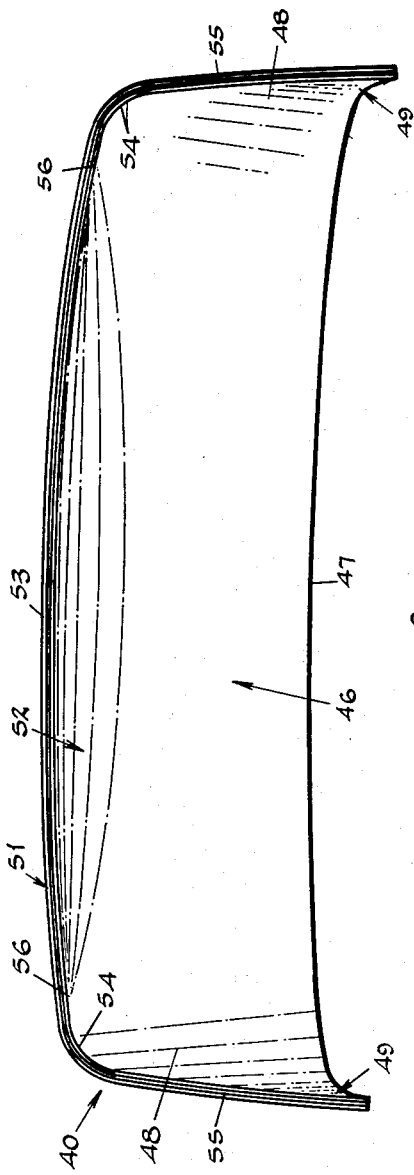
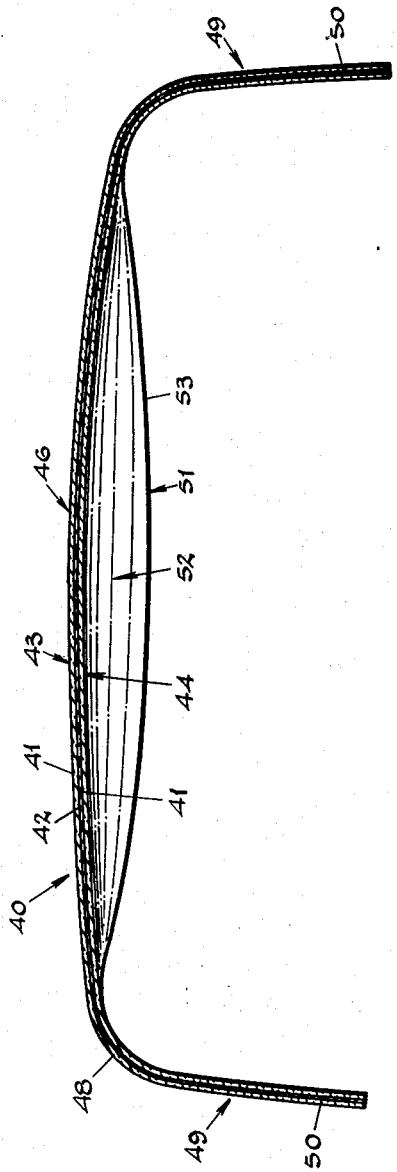
INVENTORS
Frank J. Carson and
BY Herbert A. Lefeet, Jr.
Nobbe & Swope
ATTORNEYS Dec. 17, 1963   F. J. CARSON ETAL   3,114,571
VEHICLE WINDSHIELDS
Filed Oct. 31, 1957   8 Sheets-Sheet 3

INVENTORS
Frank J. Carson and
BY Herbert A. Leflet, Jr.
Nobbe & Swope
ATTORNEYS

Dec. 17, 1963  F. J. CARSON ETAL  3,114,571
VEHICLE WINDSHIELDS
Filed Oct. 31, 1957  8 Sheets-Sheet 4
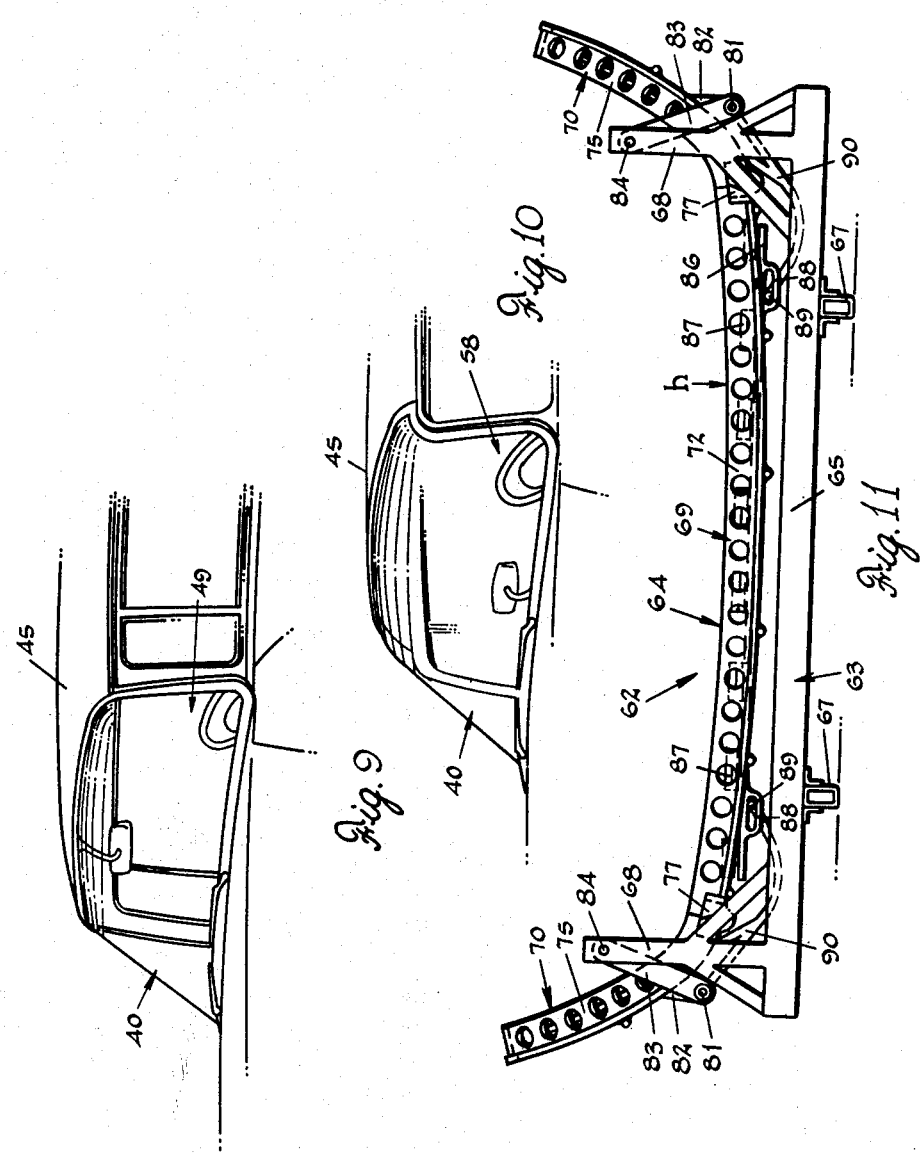
INVENTORS
Frank J. Carson and
BY Herbert A. Lyttt, Jr.
Nobbe & Swope
ATTORNEYS

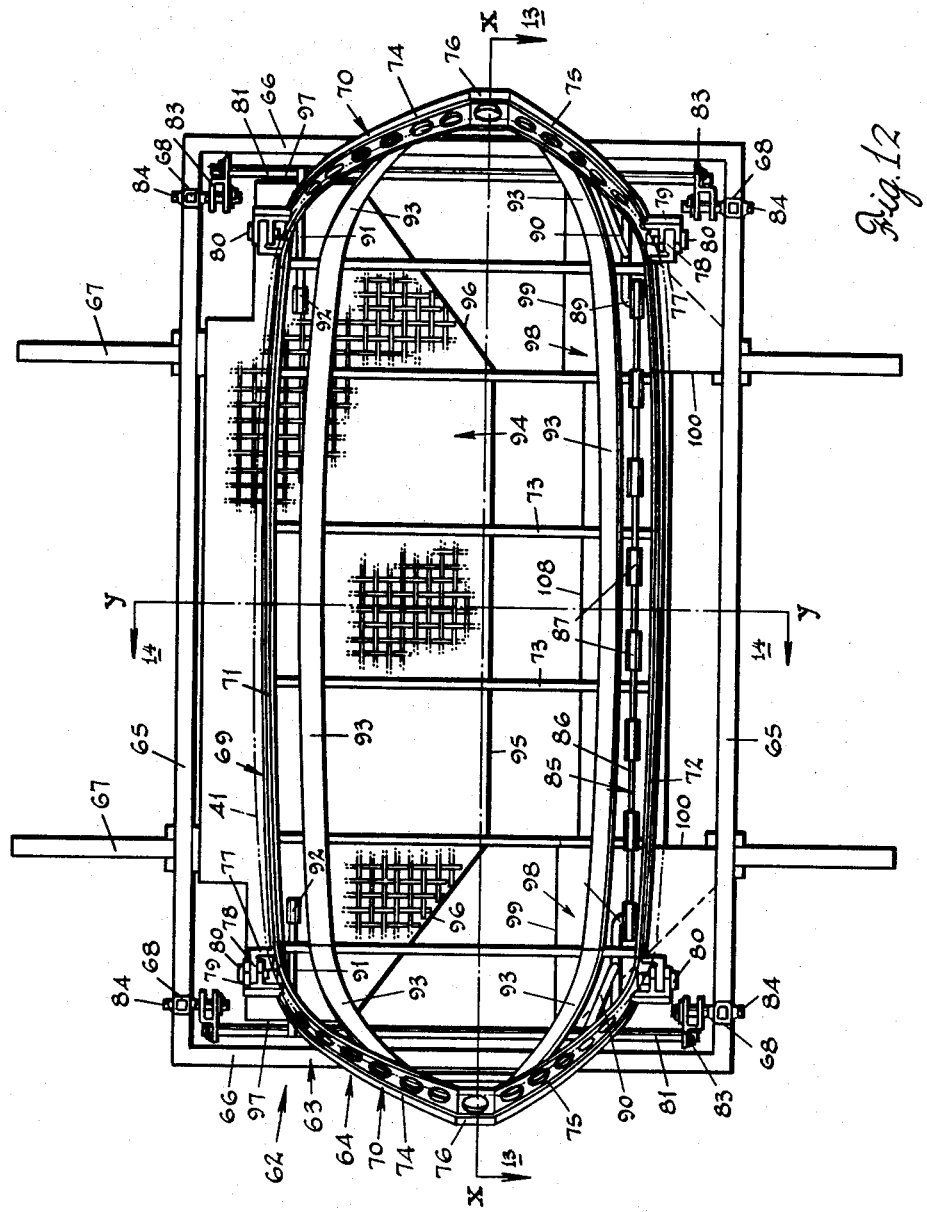

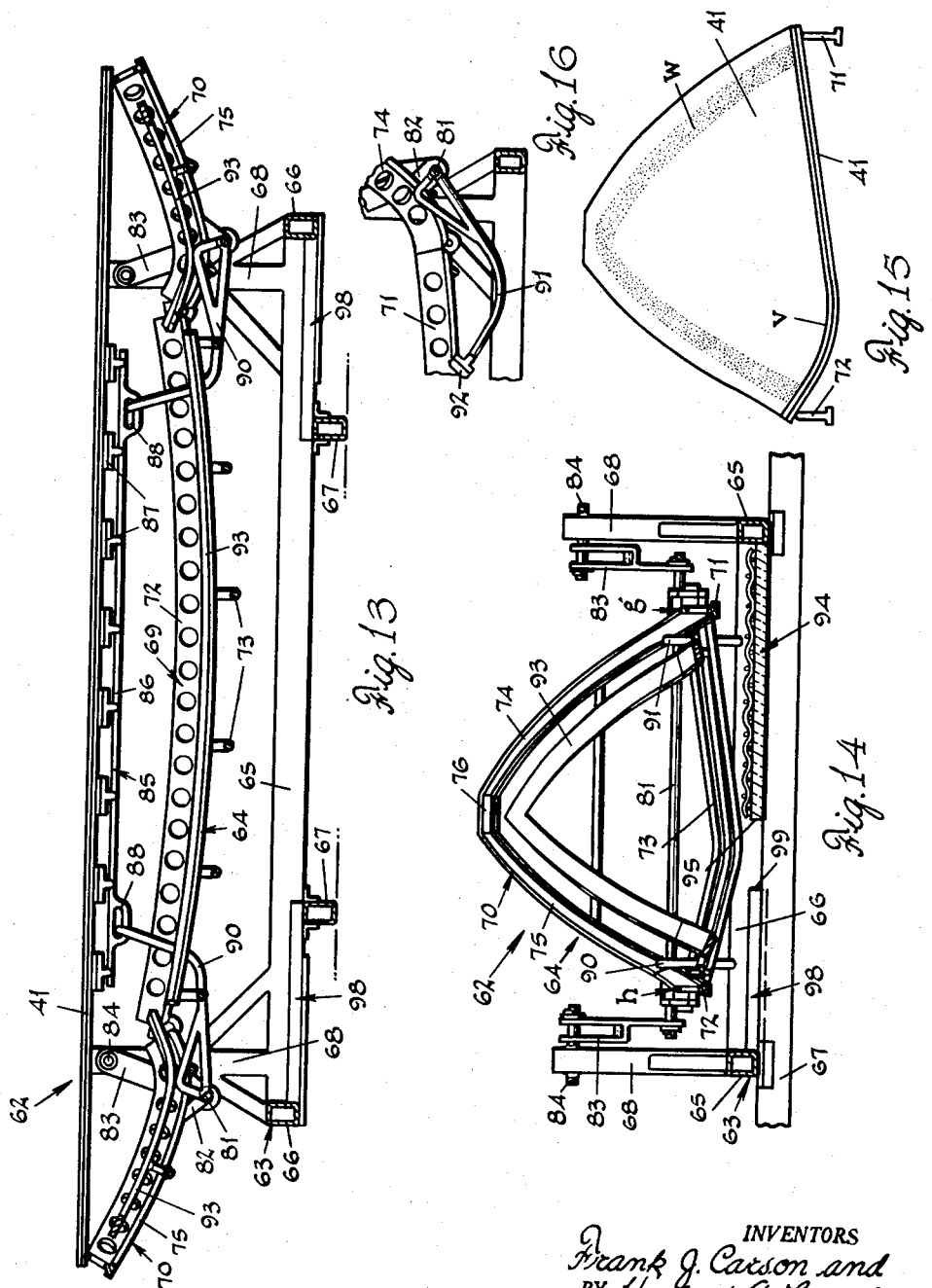

Dec. 17, 1963    F. J. CARSON ETAL    3,114,571
VEHICLE WINDSHIELDS
Filed Oct. 31, 1957    8 Sheets-Sheet 7
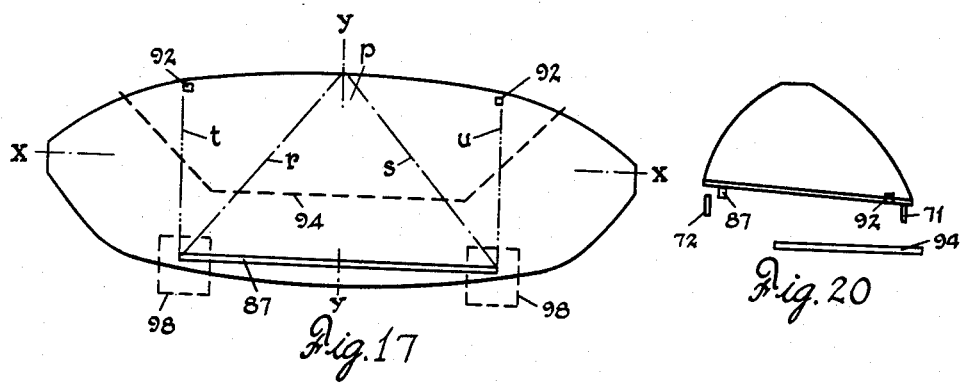
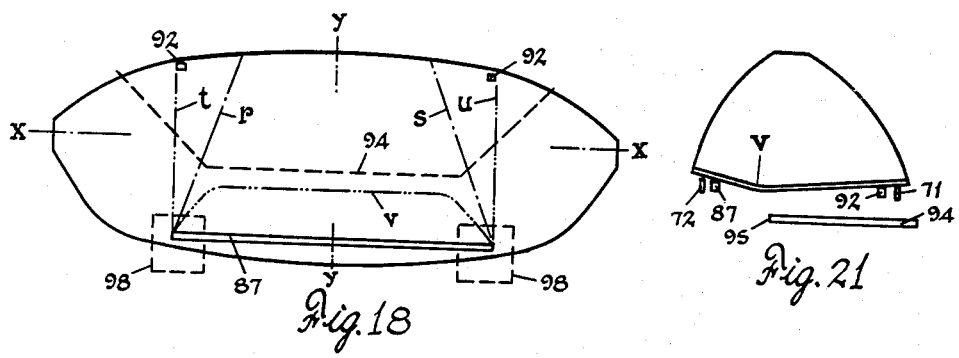
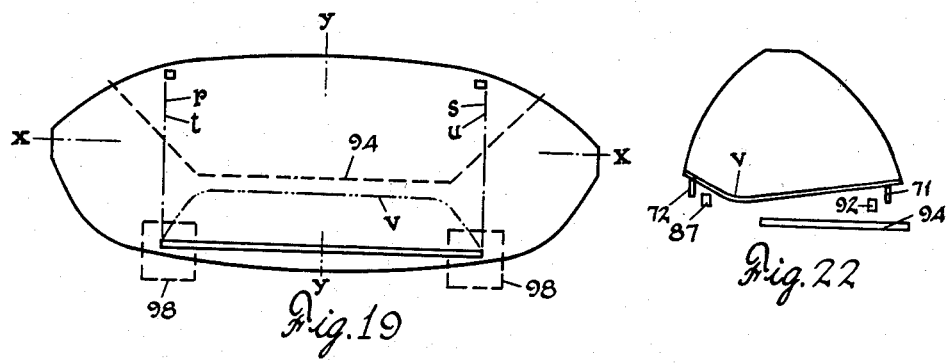
INVENTORS
Frank J. Carson and
BY Herbert A. Leflet, Jr.
Nobbe & Swope
ATTORNEYS Dec. 17, 1963  F. J. CARSON ETAL  3,114,571
VEHICLE WINDSHIELDS
Filed Oct. 31, 1957  8 Sheets-Sheet 8

INVENTORS
Frank J. Carson and
BY Herbert A. Leflet, Jr.
Nobbe & Swope
ATTORNEYS

United States Patent Office 3,114,571
Patented Dec. 17, 1963

3,114,571
VEHICLE WINDSHIELDS
Frank J. Carson and Herbert A. Leflet, Jr., Toledo, Ohio, assignors to Libbey-Owens-Ford Glass Company, Toledo, Ohio, a corporation of Ohio
Filed Oct. 31, 1957, Ser. No. 693,685
6 Claims. (Cl. 296—84)

The present invention relates broadly to vehicle windshields, and more particularly to a novel windshield curved about both the longitudinal and transverse axes thereof.

This application is a continuation-in-part of our co-pending application Serial No. 574,329, filed March 27, 1956, now Patent No. 2,893,170.

The wide-spread popularity of the so-called panoramic or hook-type windshields has created a popular demand for greater visibility and increased viewing area in automobiles. Such a demand has necessitated increasing the viewing area or total glass surface of the windshield to such an extent that it is becoming increasingly difficult to minimize light distortion in such a windshield, especially in regions of sharp curvature. This is especially true when the panoramic type windshields are extended upwardly and then swept back in a curve to meet the roof panel of the automobile to form what may be termed a "cap" windshield.

Such a windshield construction involves a bend about both major axes of the glass sheets used to form the windshield. The usual longitudinal bend about the transverse axis of the sheet is necessary to form the relatively sharply curved end portions of the windshield, and a second bend about the longitudinal axis of the sheet is required to form the cap portion curvature.

In the past, the bending of glass sheets to panoramic shape has proved to be extremely difficult, and with the addition of the curved cap portion at the top of the windshield, the difficulties encountered in bending the glass sheets have been almost insurmountable in that it was found that it was extremely difficult to produce a "cap" windshield which would be free of optical distortion, especially in the regions of sharp curvature where the main end cap portions join the end sections.

Therefore, an important object of the present invention is to provide an improved vehicle windshield which is comparatively free from optical distortion and yet provides a wide angle viewing area.

Another object of the invention is to provide a distortion free vehicle windshield having a bend about both major axes of the windshield.

Another object of the invention is to provide a vehicle windshield having an increased viewing area and having a bend about several different axes in which none of the bends intersect in regions of sharp curvature.

Another object of the invention is to provide a vehicle windshield having greater visibility and increased viewing area by providing a swept back or cap portion that extends the full length of the main central portion of the windshield and curved or hooked end portions that extend the full width of the central portion.

A further object of this invention is to produce a vehicle windshield in which the regions of relatively sharp curvature between the central portion and the end portions are distortion free and comprise straight line elements extending from the lower longitudinal edge of the windshield to the upper longitudinal edge thereof.

Other objects and advantages of the invention will become more apparent during the course of the following description when taken in connection with the accompanying drawings.

In the drawings, wherein like numerals are employed to designate like parts throughout the same:

FIG. 1 is a perspective view of the novel cap windshield constructed in accordance with the invention;

FIG. 2 is an end view of the windshield of FIG. 1 when installed in an automobile;

FIG. 3 is a transverse sectional view taken along the line 3—3 of FIG. 1;

FIG. 4 is a rear view of the cap windshield of FIG. 1;

FIG. 5 is a longitudinal section taken along the line 5—5 of FIG. 2;

FIG. 9 is a perspective view of the cap windshield of FIG. 1 when installed in an automobile;

FIG. 10 is a perspective view of the modified cap windshield installed in an automobile;

FIG. 11 is a side elevation view of a bending mold for forming the novel windshield of the invention and shown in its closed position;

FIG. 12 is a plan view of the bending mold shown in FIG. 11;

FIG. 13 is a longitudinal section taken along the line 13—13 of FIG. 12 and showing the mold in the open position with a pair of glass sheets to be bent supported thereon;

FIG. 14 is a transverse section taken along the line 14—14 of FIG. 12;

FIG. 15 is a transverse sectional view of a pair of glass sheets bent to a cap curvature;

FIG. 16 is a fragmentary side elevation showing a part of the glass sheet support means of the mold;

FIGS. 17, 18 and 19 are plan views of glass sheets to be bent to cap curvature while passing through various stages of the bending procedure;

FIGS. 20, 21 and 22 are sectional views taken along the transverse center line of the sheets shown in FIGS. 17, 18 and 19 respectively;

Figure 6:
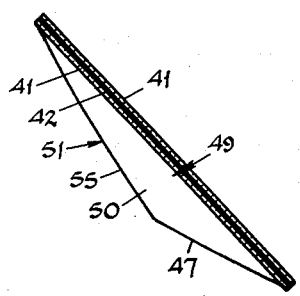
FIG. 6 is a section taken along the line 6—6 of FIG. 2.

With reference now to the drawings, FIGS. 1 to 6 and 9 show a modified panoramic or "cap" windshield 40 comprising a pair of bent glass sheets 41 having a plastic interlayer 42 therebetween and laminated to one another as shown in FIG. 3. The windshield 40 has a front surface 43 and a rear surface 44, each facing the respective ends of the vehicle 45 shown in FIGS. 2, 3 and 9.

In order to provide the desired double curvature, which affords increased viewing area, each of the glass sheets 41 is bent about both its longitudinal and transverse axes x—x and y—y, respectively as shown in FIG. 1. The glass sheet 41 is symmetrically bent about the transverse axis, as best illustrated in FIG. 5 to produce a rather gently bent central sheet portion 46 which includes a relatively flat very gently curved sheet portion adjacent the lower longitudinal edge 47 of the windshield 40 and which extends upwardly a limited distance to form that portion of the windshield 40 which is located immediately forward of the front seat of the vehicle shown in FIGS. 2 and 9.

The panoramic effect is created in the windshield 40 by terminating the long sweeping arcs of the relatively shallow central portion 46 in regions of sharp curvature 48 to form sharply bent wing portions 49 including the regions of sharp curvature 48 and flat triangularly shaped wing end portions 50. For the purpose of the present invention, a sharp curvature is defined as one having a radius of curvature not exceeding about 12 inches.

As shown in FIG. 5, the wing portions 49 extend rearwardly from the front surface 43 of the glass sheet 41 and have their triangular shaped end portions 50 located in spaced, substantially parallel planes. In order to secure the greatest symmetrical viewing area possible, the wing portions 49 are made substantially the same width in the regions of sharp curvature 48 as the central portion 46 shown in FIGS. 1 and 2.

As shown in FIGS. 1, 2 and 9, the wing portion 49 extends from the lower longitudinal edge 47 which defines the cowl line of the vehicle 45 to the upper longitudinal edge 51 of the glass sheet 41. As most clearly shown in FIG. 6, the surface of the wing portion 49 is defined by straight line elements the ends of which terminate at the lower longitudinal edge 47 and the upper longitudinal edge 51 of the windshield 40. The lower edge 47 of the glass sheet 41 lies in a plane which is common to both the lower edge of the central portion 46 and the lower edge of the wing portions 49. The radius of curvature of that portion of the region of sharp curvature 48 which lies in the plane of the lower longitudinal edge 47 is approximately 12 inches, and the radius of curvature of the region of sharp curvature becomes progressively less towards the upper longitudinal edge 51 of the wing portion and is at a minimum at the edge 51. Thus, due to the progressively decreasing curvature, the straight line elements defining the surface of the windshield in the regions of sharp curvature form the surface of a segment of an ungula or truncated cone and radiate from a point spaced outwardly from the glass sheet.

As shown in FIGS. 2 and 9, the cap portion 52 extends rearwardly to the vehicle roof and also extends longitudinally substantially parallel to the longitudinal axis $x-x$ of the glass sheet 41. Referring to FIGS. 1 and 3, the cap portion 52 comprises a relatively flat sheet portion adjacent to and extending inwardly from the upper longitudinal sheet edge 51, and which sheet portion is angularly disposed to the planes defined by end portions 50 of the wings 49.

Referring now to FIG. 4, the upper longitudinal edge 51 of the glass sheet 41 consists of the relatively flat substantially horizontal rear edge 53 of the cap portion 52, relatively sharply curved upper edges 54 of the regions of sharp curvature 48, and the substantially vertical parallel rear edges 55 of the flat triangularly shaped wing end portions 50. The radius of curvature of the relatively sharply curved portion 54 of the upper longitudinal edge 51 is quite small, being approximately 4½ to 6 inches. The endmost points 56 of the cap portion 52 which define substantially the length of both the cap portion 52 and the central portion 46 are located approximately at the points in the upper longitudinal edge 51 where the rear edge portion 53 meets the relatively sharply curved portions 54.

In order to minimize distortion, the substantially flat cap portion 52 is connected to the rather gently curved central sheet portion 46 by means of a region of non-uniform curvature 57, as shown in FIGS. 1 and 3. The non-uniformly curved sheet portion 57 is bent transversely of the central portion 46 about the longitudinal axis $x-x$ of the glass sheet 41. As shown in FIGS. 1 and 4, the smallest radius of curvature of this non-uniform bend is located at the center of the windshield 40 at which point it is between 11 and 12 inches, and the radius becomes progressively larger outwardly of the transverse sheet axis $y-y$ until the bend disappears at the points 56 which are adjacent to the regions of sharp curvature 48 and identify the endmost points of the cap portion 52. Thus, the non-uniformly curved sheet portion 57 which connects the central portion 46 with the cap portion 52 does not intersect the sharply bent sheet portions 48 which connect the central portion 46 with the end portions 50.

Figure 8:
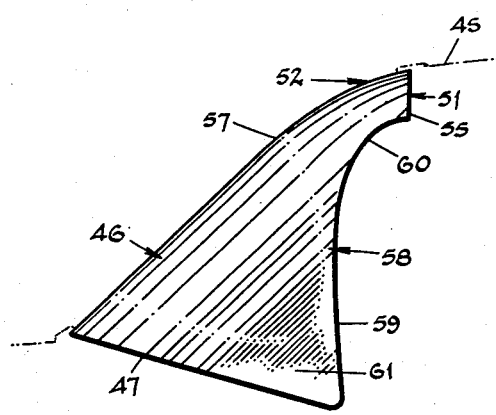
FIG. 8 is an end view of the modified cap windshield of FIG. 7.
Figure 7:
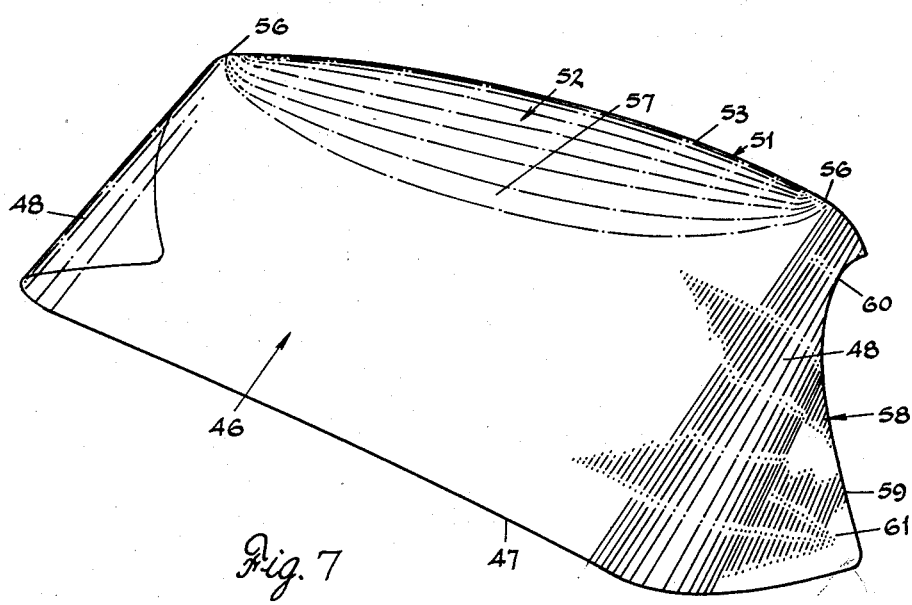
FIG. 7 is a perspective view of a modified cap windshield.
Figure 23:
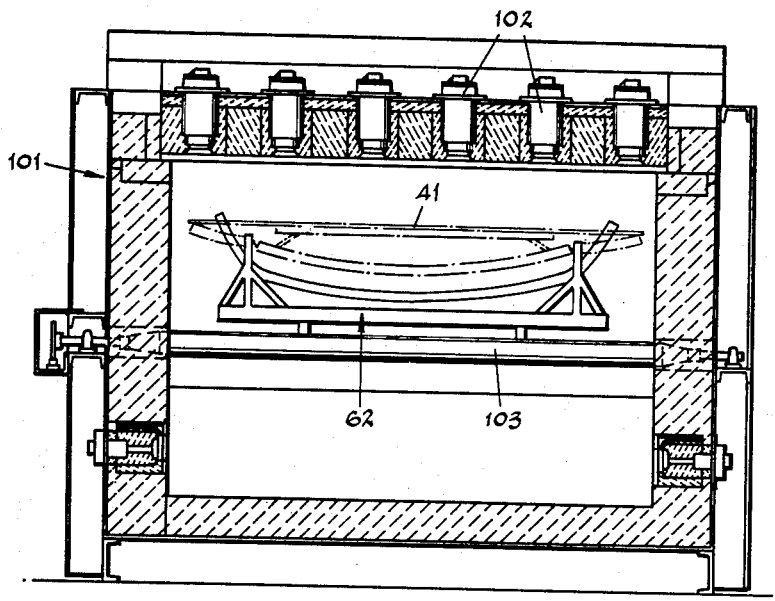
FIG. 23 is a sectional view of a furnace in which glass sheets may be bent to form the cap windshield of the invention.

FIGS. 7 and 8 show a modified cap windshield also having a central portion 46, a cap portion 52, and wing portions 58 joined by curved portions 48 and 57. Like numerals have also been used to identify parts of the windshield which are similar to those of the windshield of FIGS. 1 and 2.

However, the windshield described in FIGS. 7 and 8 is distinguished from the one illustrated in FIGS. 1 and 2 in that a portion of modified wing portions 58 have been notched out or removed and such a windshield is shown installed in an automobile in FIG. 10. The contour of the notched out wing portions 58 is defined by a straight portion of the lower longitudinal edge 47 which intersects an upwardly extending straight edge section 59. The straight section 59 at its uppermost end merges into a curved edge portion 60 which in the preferred embodiment intersects the upper longitudinal edge 51 of the windshield 40 in the relatively sharply curved upper edge 55 of the region of sharp curvature 48. If desired, the curved section 60 may intersect the upper longitudinal edge 51 in a substantially vertical rear edge of the end portion 61.

The surface of the modified wing portion 58 is defined by straight line elements which extend from the lower longitudinal edge 47 to the upwardly extending straight edge section 59, the curved edge section 60 at the uppermost end of the straight edge section 59, and the sharply curved edge 55 of the sheet 41 respectively. The notched out portions of the modified wing portions are not limited to the flat end portions 61, but may extend into the regions of sharp curvature 48.

While the windshield 40 gives the impression of being compoundly bent with two regions of sharp curvature intersecting each other, these curves are kept separate and distinct both in the windshield and in the bending of the windshield as described below.

There is shown in FIGS. 11 to 14 an improved bending apparatus 62 including a mold of the concave, hinged type which has been constructed in accordance with the present invention and which may be used to form a glass sheet, or pair of sheets, to the complex curvatures required by cap windshields. The bending apparatus 62 comprises a supporting rack 63 and a bending mold 64 carried thereby. The rack 63 is substantially rectangular in shape and comprises spaced longitudinal side rails 65 rigidly connected to one another at their opposite ends by end rails 66. As a means of guiding the rack through the glass bending furnaces commonly used, a pair of transversely spaced guide rails 67 are secured to the underside of the side rails 65 and may be received within guide flanges associated with the conveyor rolls used in most bending furnaces. To support the mold 64 above the rack 63, an upright 68 is spaced slightly inwardly from each of the opposite ends of the side rails 65 and rigidly secured to the upper surface thereof.

The mold 64 is of the general type commonly termed an outline or skeleton mold and comprises a movable center section 69 and opposite end sections 70 movably connected at their inner ends to the center section. As best seen in FIGS. 12 and 14, the mold center section 69 comprises spaced side rails 71 and 72 formed by inverted T sections and having their upper surfaces $g$ and $h$ finished to form a shaping surface adapted to receive and form a glass sheet when bent into contact therewith. In plan view, each of the side rail sections 71 and 72 is bowed inwardly to a relatively slight degree of curvature and are rigidly joined to one another by a plurality of bent tie rods 73.

As shown in FIG. 14, the upper surface $g$ of the rail section 71 is substantially flat in cross-sectional view while, for a purpose to be later described, the upper surface $h$ of the opposite rail section 72 is convexly curved.

Each of the mold end sections 70 is substantially identical in shape and each comprises a pair of curved side rails 74 and 75, formed from inverted T sections, having their upper edges finished and joined together at their outermost ends by a relatively short and straight rail section 76. As shown in FIGS. 12 and 14, the inner ends of the end section side rails 74 and 75 are aligned with the adjacent ends of the center section side rails 71 and 72 and form, when the mold is in the closed position of FIG. 11, a substantially continuous curved shaping surface to properly shape the glass sheets to be bent.

To movably connect the mold end sections 70 to the center section 69, the opposite ends of each of the center section side rails 71 and 72 have an angle section 77 extending outwardly therefrom which has a longitudinally extending bar portion 78 thereof pivotally received within a yoke-like member 79 extending outwardly from the adjacent ends of the end section side rails 74 and 75. Suitable axially aligned holes are provided in the yoke and bar portions to receive a pin 80 which acts as a pivot member and completes the hinged joint.

The mold is supported for movement from an open position (FIG. 13) to a closed position (FIG. 11) by means of a transverse rod 81 rigidly secured to each of the mold end sections 70 by means of V-shaped members 82 depending from the rail sections 74 and 75. The opposite ends of the rods 81 extend outwardly beyond the rail sections 74 and 75 and each is rotatably secured in the lower end of a link 83 having its upper end swingably supported by means of a pin 84 secured in the upper end of the adjacent upright 68.

As will be later set forth in detail, one of the important features of the present invention is the particular manner in which the glass sheet to be bent is supported both prior to and during the bending thereof. To support a glass sheet 41, or pair of sheets, there is provided glass sheet supporting means operatively connected to certain of the mold sections and which support the sheet while lowering the same into contact with the mold shaping surface in such a manner as to impart a transverse curvature to the sheet to be bent. As shown in FIGS. 12 and 13, sheet supporting means designated in its entirety by the numeral 85 is positioned adjacent the center section rail 72 and spaced slightly inwardly therefrom to support one of the longitudinal marginal edge areas of the glass sheets. The support means 85 comprises a longitudinally disposed bar 86 having a series of relatively closely spaced sheet-receiving blocks 87 supported thereon along substantially the entire length thereof. Each of the blocks 87 is pivotally mounted on the bar 86 for rocking movement in a vertical plane which enables the block to properly conform to the undersurface of the lowermost of the glass sheets 41. At each of its opposite ends, the bar 86 has an oblong ring 88 formed therein through which is slidably received the end portion 89 of a bent arm 90 having its opposite end rigidly secured to the adjacent rotatably supported rod 81 which carries the mold.

As shown in FIGS. 12 and 16, the opposite longitudinal edge areas of the glass sheets are supported at two spaced points, intermediate the ends thereof, by means of a pair of bent arms 91, similar to the arms 90, having sheet-contacting blocks 92 identical with the blocks 87, secured to their innermost ends and having their outermost ends rigidly secured to the adjacent rods 81. The blocks 92 are transversely aligned with the endmost blocks 87 carried by the rod 81 and, as will be later described in detail, during the closing action of the mold the arms 90 and 91 move in synchronous relationship with one another to properly support and lower the glass sheets to be bent onto the mold shaping surface.

It is oftentimes desirable that a peripheral compression band be formed in the glass sheets which are trimmed along said band and thus provided with a toughened edge. For this purpose, bar sections 93, contoured to the shape of the mold rail sections, are secured to the mold center and end sections and spaced inwardly from the adjacent rail sections. As is well known in the art, after the glass sheets are bent into contact with the mold shaping rail and annealed, the sheet portions between said rail and the bar sections 93 set in compression. If it is desired to make a modified "cap" windshield as shown in FIGS. 7 and 8 the bar section 93 is contoured to permit the notched out portion to be removed from the wing sections while maintaining the edge of the windshield in compression.

In order to obtain very accurate control of the degree of bend and the exact location of the points of bending in the glass sheets to be bent, it is desirable that the heating of certain portions of the sheets being bent is retarded with respect to other portions. In other words, the portions of the sheet to be bent to relatively sharp curvatures are heated to a higher temperature than other portions of the sheet not requiring relatively sharp bends. As a means of retarding the heating of portions of the sheet not requiring a sharp bend, a heat absorbing member 94 is positioned beneath the center section 69 of the mold and supported upon the members 67 forming a part of the rack 63. As best shown in FIG. 12, the member 94 is substantially trapezoidal in shape and extends inwardly beneath the rail 71 of the mold center section to a point somewhat beyond the longitudinal axis $x$—$x$ of the glass sheets. The inner or leading edge 95 of the member 94 is substantially parallel with the side rails 71 and 72 of the mold center sections and terminates somewhat short of the ends thereof at diverging, rearwardly extending side edges 96. The side edges 96 extend rearwardly beyond the ends of the rail 71 and terminate in relatively straight edge sections 97. The member 94 may be formed of many heat absorbing substances and be of different forms of construction. It has been found that a grid-like construction of intersecting metallic rods or bars, supported upon a layer of Marinite, will give good results in terms of retarding the heating of the portions of the glass sheets disposed thereover.

To further control the heating of the glass sheets a members 98 are secured to the rack adjacent and beneath the ends of the center section rail 72. As shown in FIG. 12, the members 98 have their inner longitudinal edges 99 spaced from the inner longitudinal edge 95 of the member 94, and their transverse inner edges 100 substantially aligned with the intersection point of the leading edge 95 of the member 94 with the diagonal edges 96 thereof.

Although various types of bending furnaces may be used to heat the glass sheets to be bent, we prefer to use a furnace 101 which has a plurality of radiant type burners 102 mounted in the roof thereof which may be controlled to direct a selective and variable pattern of preformed beams of radiant heat downwardly at the path of bending molds as they pass through the furnace while being supported on the conveyor 103 thereof.

Figure 24:
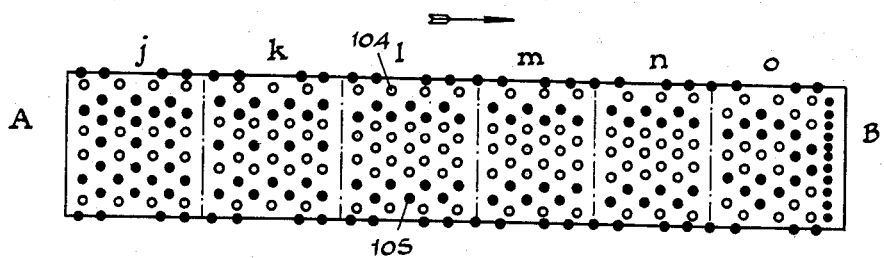
FIG. 24 is a plan view of the roof burner pattern used in the furnace shown in FIG. 23.

One of the important aspects of the present invention is the particular way in which heat is directed toward the glass sheets 41 to be bent while they are passed through the furnace 101. To illustrate this portion of the method of the invention, a diagram of the roof burners 102 is shown in FIG. 24 wherein the open circles 104 designate non-firing burners, or burners firing at a relatively low heat emission rate, and the solid circles 105 indicate burners firing at a greater heat emission rate. For purposes of subsequent description, the roof pattern shown in FIG. 24, is divided into six heating areas or zones which are designated by the letters $j$ to $o$.

In bending a pair of glass sheets 41 by the method and apparatus of the invention, the mold sections are moved from the normally closed position of FIG. 11 to the open spread-apart position of FIG. 13. During such movement, wherein the links 83 swing outwardly, the arms 90 and 91, which are rigidly secured to the transverse rods 81, are rotated upwardly and inwardly due to the outward and downward rotation of the tips of the mold end sections 70 which imparts rotative movement to their respective support rods 81. When the mold sections are in the full open position, the upper surfaces of the glass supporting blocks 87 and 92 are in substantially the same horizontal plane as the upper edges of the rail sections 76 located at the tips of the mold end sections 70.

The pair of glass sheets, which are rough cut to pattern outline, is then placed upon the mold and the marginal end portions of the lowermost sheet are supported by the rail sections 76. When the sheet ends are thus supported, the one longitudinal sheet edge is supported substantially continuously along a substantial portion of its length, intermediate the supported ends thereof, by the plurality of support blocks 83, and the opposite longitudinal edge portion is supported at spaced-apart points by the blocks 92. The glass sheets, due to their rigid condition when cold, restrain the mold end sections from moving upwardly and thus maintain the mold sections in the open spread-apart position of FIG. 13.

After the sheets are positioned thereon, the mold is then passed into the entry end A (FIG. 24) of the furnace 101. Upon entering the furnace, the sheets are subjected to a relatively uniform concentration of heat from the roof burners in zone $j$ in order to gradually raise the overall temperature thereof. At the same time, however, the portions of the sheets disposed above the heat-absorbing members 94 and 98 have the heating thereof retarded due to the absorption of heat by these members from the furnace atmosphere adjacent those portions of the sheet and also due to the fact that the members do not allow their corresponding sheet portions to completely "see" the relatively hotter furnace floor and thus absorb radiant heat therefrom.

As the mold passes through the furnace, the glass sheet is subjected to gradually increasing temperatures and the heat is selectively applied to predetermined areas thereof to properly control the bending of the glass sheets. Thus as shown in FIG. 24, after passing through the initial or preheat zone $j$ of the furnace 101, the mold passes into and through successive furnace zones $k$ to $n$ wherein the heat is concentrated upon the sheets outwardly of the central portion and inwardly somewhat of the ends thereof and substantially along transverse sheet portions adjacent and above the mold hinges. The selective application of heat to these portions of the sheet, which are subjected to the severest bend, raises the temperature thereof to a point calculated to properly enable them to readily conform to the desired relatively sharp curvature of the corresponding portions of the mold. At the same time, however, the central portion of the sheets and the end extremities thereof, which are not required to assume relatively sharp curvatures, are not substantially affected by the heat concentrations at the points of maximum desired curvature.

The mold is retained within zones $k$ to $n$ for a time interval sufficient to raise the overall temperature of the sheets to bending temperature whereat the sheets soften and lose their rigid character. At this time, the mold end sections 70 which have a relatively constant tendency to return to the closed position, due to the weight of the center section, begin to rotate inwardly toward the closed position. In so doing, the tips of the mold end sections begin to move upwardly and inwardly upon moving axes of rotation defined by the swingably supported transverse rods 81. The mold center section begins to move downwardly, and the arms 90 and 91 rotate inwardly and downwardly thus lowering the glass sheets therewith while continuing to support the same upon the blocks 87 and 92.

As previously mentioned and as shown in FIGS. 12 and 13, the blocks 87 support the one longitudinal edge of the lowermost glass sheet in the central portion and along a substantial portion of its length while the blocks 82 support the opposite longitudinal edge of the glass sheet at two relatively greatly spaced points equidistant from the transverse sheet center line $y$—$y$. Thus, as the sheet is lowered toward the mold shaping surface, the longitudinal sheet edge portion between the spaced blocks 92 begins to sag between said blocks while the opposite sheet edge engaged by the blocks 87 is supported substantially horizontal or flat or moves through a descending series of substantially horizontal planes of support prior to contacting the adjacent shaping rail 72.

As shown in FIGS. 15 and 17 to 22, the effect of so supporting and lowering the hot sheets sags or deflects the sheet portion $p$ midway between the blocks 92 into contact with its adjacent rail 71 prior to other sheet portions contacting their respective portions of the mold shaping surface.

Thus during the closing action of the mold, the central portion of the sheet, as defined by the blocks 92 and the endmost blocks 87, is deflected or folded about a pair of transversely converging and intersecting fold lines $r$ and $s$ having their apex adjacent the sheet portion $p$ that first contacts the rail section 71 and their bases terminating at the opposite marginal edge portion of the sheets substantially at the portion thereof being supported by the outermost blocks 87. Thus the central portion of the sheet is folded in triangular fashion since the fold lines $r$ and $s$ are of theoretical equal length and form two legs of an isosceles triangle, and the sheet portion $p$ is at the midpoint of the base of the triangle as defined by the row of blocks 87. In addition, since the blocks 87 and 92 are lowering the sheet during the closing action of the mold, the sheet ends are folded or bent upwardly about additional fold lines $t$ and $u$ which are substantially parallel to one another and to the transverse axis $y$—$y$ of the sheets and have their ends terminating at the endmost blocks 87 and the blocks 92 transversely spaced therefrom.

As the mold continues the closing movement, the sheet edge areas on either side of the marginal portion $p$, initially contacting the shaping rail 71, contact said rail in a progressive outward movement so that the sheets continue to be folded along the fold lines $r$ and $s$ which, in effect, have their intersecting ends (FIG. 18) rotated outwardly while the location of their opposite ends remains relatively constant and determined by the outermost support blocks 87.

As shown in FIG. 21, a transverse bend in the sheet about the longitudinal axis $x$—$x$ thereof begins to take place after the sheet portion $p$ has contacted the rail 71 since both the portion $p$ and the sheet portions opposite thereto are supported and the portions of the glass therebetween are at bending temperature. The line of transverse bending $v$ is positioned somewhat beyond the leading edge 95 of the member 94 since said member continues to absorb heat from the portion of the furnace atmosphere adjacent the undersurface of the glass sheets immediately thereabove and thus retards the heating of said portions.

As shown in FIG. 19, after the mold has reached the fully closed position, the formerly intersecting fold lines $r$ and $s$ have merged with the transverse fold lines $t$ and $u$ so that the sheet is substantially finally bent about the transverse axis $y$—$y$ thereof. At this time, the longitudinal fold line $v$, which develops due to the bending about the longitudinal axis $x$—$x$ of the sheets, has the opposite ends thereof curved outwardly toward the sheet edges above the rail 72. This is caused by the effect of the heat absorbing members 98 which retard the heating of the portions of the glass sheets immediately thereabove and thus draw the line of folding or bending $v$ outwardly due to the flattening out of these portions of the sheets as a result of having the heating thereof retarded.

After the sheets have been bent into conformity with the mold shaping surface, the mold is passed into furnace zone $o$. In this zone, the sheet is heated in the central portion thereof while the sheet portions outwardly thereof are not subjected to additional heat. The heat concentration in the central portion of the sheet, in effect, is a continuation of bending heat which causes bending in only the central portions of the sheets to conform said portions to their final cap curvature as shown in FIGS. 1 and 2.

In bending to the final curvature, the sheet edge (FIG. 15) supported on the rail 75, aided by the convexly curved shaping surface thereon, rotates upwardly somewhat while the portion of the sheet defining the line $v$ of maximum transverse bending is lowered. Since the heating of the portion of the sheets inwardly of the rail 71 is retarded by the member 94, most of the sheet bending in furnace zone $o$ takes place in sheet portions adjacent the rail 72. Of course, the length of time the mold is in zone $o$, as well as the other furnace zones, is carefully controlled so that the sheet will not bend excessively.

After leaving furnace zone $o$, the mold is passed through a suitable annealing furnace which may be a continuation of the furnace 101. In the annealing furnace, the temperature of the sheets is slowly lowered to approximately room temperature and the compression pattern $w$ (FIG. 15) is set. The sheets are then removed from the mold and cut to final pattern size along the outer edge of the compression band.

It is oftentimes desirable to vary the location of the heat-absorbing members and in some instances to add additional heat-absorbing members. For example, to maintain accurate positioning of the line $v$ of transverse curvature, an additional heat-absorbing member 108 (FIG. 12), of relatively narrow width, may be positioned beneath the rail 72. As explained in our prior filed application Serial No. 527,725, filed August 11, 1955, now abandoned, this aids in concentrating heat on the central sheet portions requiring maximum bending. Such heat concentrations are often necessary when bending glass sheets to the curvature required in producing cap windshields of the type shown in FIG. 10 wherein the curvature of the cap portion is more severe.

In the foregoing specification and the claims, the term "fold line" is used for clarity of description. However, the use of this term does not mean that the glass sheets are actually creased and the fold lines only indicate axes or reference lines, in addition to the major sheet axes, about which the glass sheets are bent.

It is to be understood that the form of the invention herewith shown and described is to be taken as a preferred embodiment of the same, and that various changes may be resorted to without departing from the spirit of the invention or the scope of the subjoined claims.

We claim:
1. A panoramic cap-type vehicle windshield, comprising at least one sheet of glass sharply bent adjacent its opposite ends to provide a middle portion constituting the major area of said glass sheet flanked by side wings of smaller area extending rearwardly from said middle portion and connected thereto by transverse regions of sharp curvature extending from one longitudinal edge of said glass sheet to the other, said glass sheet also being bent adjacent its upper longitudinal edge to provide a cap portion extending rearwardly from the middle portion and connected to said middle portion by a longitudinal region of curvature extending substantially parallel with said middle portion between said regions of sharp curvature only.

2. A windshield as defined in claim 1 in which said middle portion is generally rectangular in shape, and said transverse regions of sharp curvature extend from one longitudinal edge of said middle portion to the other.

3. A windshield as defined in claim 2 in which said wing portions are notched in a contour defined by a substantially straight section intersecting one longitudinal edge of said glass sheet and merging into a curved section intersecting another edge of said glass sheet.

4. A windshield as defined in claim 1 in which said transverse regions of sharp curvature form segments of truncated cones.

5. A windshield as defined in claim 1 in which said longitudinal region of curvature is nonuniform about its axis of curvature.

6. A windshield as defined in claim 5 in which said nonuniform curvature is sharpest at the middle of said windshield and decreases progressively outwardly therefrom.

References Cited in the file of this patent

UNITED STATES PATENTS

| | | |
|---|---|---|
| D. 164,149 | Allen | Aug. 7, 1951 |
| D. 180,509 | Earl | June 25, 1957 |
| 778,330 | Pond | Dec. 27, 1904 |
| 2,399,652 | Rappl | May 7, 1946 |
| 2,751,246 | Barenyi | June 19, 1956 |
| 2,817,559 | Nickles | Dec. 24, 1957 |
| 2,924,485 | Miles | Feb. 9, 1960 |

FOREIGN PATENTS

| | | |
|---|---|---|
| 246,162 | Switzerland | Sept. 1, 1947 |

OTHER REFERENCES

The Motor Trend magazine, October 1953, page 49.

UNITED STATES PATENT OFFICE
CERTIFICATE OF CORRECTION

Patent No. 3,114,571                                              December 17, 1963

Frank J. Carson et al.

It is hereby certified that error appears in the above numbered patent requiring correction and that the said Letters Patent should read as corrected below.

Column 6, line 37, after "a" insert -- pair of spaced, substantially rectangular heat absorbing --; column 8, line 6, for "or", second occurrence, read -- and --.

Signed and sealed this 28th day of April 1964.

(SEAL)
Attest:

ERNEST W. SWIDER                                      EDWARD J. BRENNER

Attesting Officer                                            Commissioner of Patents